United States Patent [19]

Pejouhy et al.

[11] Patent Number: 4,713,717

[45] **Date of Patent: * Dec. 15, 1987**

[54] PROTECTED REFRIGERATOR COMPRESSOR MOTOR SYSTEMS AND MOTOR PROTECTORS

[75] Inventors: Radi Pejouhy, Marshfield, Mass.; Joseph G. Nield, Jr., Cumberland, R.I.; John R. D'Entremont, Foxboro; Beggs, Louis C., Attleboro, both of Mass.; Fabrizio Rotulo, Napoli, Italy

[73] Assignee: Texas Instruments, Dallas, Tex.

[ * ] Notice: The portion of the term of this patent subsequent to Nov. 10, 2004 has been disclaimed.

[21] Appl. No.: 794,876

[22] Filed: Nov. 4, 1985

[51] Int. Cl.⁴ ......................... H02H 3/08; H02H 5/04

[52] U.S. Cl. ......................................... 361/26; 361/29; 361/31; 361/22; 361/105; 361/106; 337/102; 337/107

[58] Field of Search ....................... 361/23, 24, 25, 27, 361/31, 103, 106, 105, 26, 32; 337/102, 107; 318/781, 782, 791, 792

[56] References Cited

U.S. PATENT DOCUMENTS

| | | | |
|---|---|---|---|
| 2,298,137 | 8/1942 | Lee | 337/365 |
| 2,768,342 | 8/1956 | Vaughan et al. | 361/32 |
| 3,452,313 | 6/1969 | Perry | 337/86 |
| 3,538,478 | 11/1970 | D'Entremont | 337/89 |
| 3,579,167 | 5/1971 | Grable | 337/102 |
| 3,656,079 | 4/1972 | Lee | 337/102 |
| 3,858,140 | 12/1974 | Hancock | 337/102 X |
| 4,039,992 | 8/1977 | Givler | 337/365 |
| 4,365,225 | 12/1982 | Olsen et al. | 337/107 X |
| 4,533,894 | 8/1985 | Bishop | 337/107 |

*Primary Examiner*—A. D. Pellinen

*Assistant Examiner*—H. L. Williams

*Attorney, Agent, or Firm*—James P. McAndrews; John A. Haug; Melvin Sharp

[57] ABSTRACT

A motor protector having a thermostat metal element thermally coupled to an electrical motor in a refrigerator compressor motor system has a heater responsive to motor current thermally coupled to the thermostat metal element and has an improved component arrangement to provide locked rotor and ultimate trip protection for the motor without requiring calibration of the operating temperature for the protector after assembly or after incorporation in the motor system.

15 Claims, 10 Drawing Figures

PROTECTED REFRIGERATOR COMPRESSOR MOTOR SYSTEMS AND MOTOR PROTECTORS

BACKGROUND OF THE INVENTION

The field of this invention is that of motor protectors and the invention relates more particularly to a refrigerator compressor motor system having inherent motor overload protection and to motor protectors for use in such a system.

Thermostat metal motor protectors adapted to provide what is called inherent motor overload protection are well known. Such protectors are both current and temperature responsive and provide both short time (locked rotor) and ultimate trip (running overload) protection to prevent overheating of motors due either to large, sharp motor overloads of brief duration or to smaller motor overloads of longer duration. In such an inherent motor protector, a dished thermostat metal means is arranged to have selected thermal coupling to an electrical motor when the protector is mounted in its intended position on the motor. The protector also has an electrical resistance heater system which is connected in series with the motor to carry the motor current for heating the thermostat metal means in response to current flowing in the heater system. During normal motor operation as motor current varies within an anticipated normal range, the combined heating effect from thermal coupling to the motor and from the electrical heater system is such that the thermostat metal means remains unactuated to maintain normal motor operation. However, if a fault condition occurs which would result in overheating of the motor so that motor damage could occur, those combined heating effects heat the the thermostat metal means to a selected actuating temperature so it moves to an inverted dished configuration with snap action to separate protector contacts and interrupt operation of the motor. If the fault condition is due to a small overload or the like and causes a small increase in motor temperature of substantial duration such as could tend to cause eventual deterioration of motor insulation or the like, the ultimate trip characteristic of the protector governs and the protector is typically actuated in response to the combined heating effect of heat transfer from the motor and from a small overload current in the resistance heater system of the protector, thereby to provide what is called running overload protection for the motor. On the other hand, if a fault condition such as a locked rotor occurs, this results in a large, sharp increase in motor current such as would tend to cause a rapid rise in the motor temperature. In this case the short time trip characteristic of the protector governs and the protector is actuated primarily in response to the increase in motor current in the resistance heater system of the protector to interrupt motor operation before the anticipated overheating of the motor occurs, thereby to provide what is called locked rotor protection for the motor. In the typical inherent motor protector, the thermostat metal means subsequently cools to a relatively lower, reset temperature and returns with snap action to its original dished configuration so that, if the fault condition has been corrected during the off-time provided by the protector, normal running operation of the motor is resumed. However, if the fault condition persists, the protector cycles on and off in the manner described for a sufficient period of time without damage to the motor to permit operator intervention to correct the fault condition. For that purpose, the thermostat metal means used in the protector has desirably had a relatively low reset temperature which was selected to provide an off-time characteristic allowing a period for operator intervention which is consistent with the practical cycle life of electrical contacts and other components in the protector.

As will be understood motor temperature occurring during overheating could exceed the temperature limits of insulation materials used in the motor windings. Protector cycling on and off during the continuation of a fault condition in the motor could exceed the cycle life of electrical contacts or other components used in the protectors. Accordingly specifications for motors and motor protectors are typically prescribed in codes established by testing services and industry associations and by governmental bodies and the like in different countries to assure that the motors and protectors have the properties necessary to meet the requirements of various applications. While different codes establish specifications in different terms, the specifications are typically intended to meet related requirements and therefore tend to have similar features. That is, in successfully applying motor protectors to provide inherent overload protections for specific electrical motors to meet those code requirements, the protectors are usually provided with a selected combination of short time (locked rotor) trip and ultimate (running overload) trip characteristics to achieve the desired protection. In that regard, the desired performance characteristics for inherent motor protectors of a particular manufacturer or group of suppliers may be defined by reference to the short time (locked rotor) trip current necessary for tripping the motor protector within a specified short trip time and by reference to the ultimate trip (running overload) current for tripping the protector assuming the current and heat transfer to the thermostat metal means are stabilized at a selected, constant level. For example, in one widely used motor protector specification, the inherent characteristics of a group of motor protectors available for use in a particular category of commercial applications are defined by reference to the short time trip current for a short trip time of ten (10) seconds and to the stabilized ultimate trip current (usually intervals of about 15 minutes) where the effective protector ambient (the ambient determined for the thermostat metal means during normal full load running operation of the motor) is taken to be 65° C., those characteristics typically being referenced in more general terms by expressing the characteristic as a ratio of such short time trip and ultimate trip currents. Inherent motor protectors having performance characteristics defined generally within particular ranges in this manner are then applied to specific motors with respect to the rate of temperature rise and the maximum permitted temperatures of the motor windings and the like by the use of bench tests, thereby to selectively match individual protectors to the motors to meet the code requirements for those motors and for providing the desired inherent overload protection for individual motors likely to be encountered.

In order to achieve present day performance requirements for inherent motor protection as above described, the thermostat metal means in the protector has been provided with selected electrical resistance properties and has been incorporated in the motor circuit as part of the resistance heater system of the protector. That is, in providing sufficient heating for the thermostat metal means to actuate the protector under each of the various different motor overload conditions likely to be encountered, it has been found that, because of heat transfer effects, the heat generated directly in a thermostat metal means having selected electrical resistance properties is more promptly effective than heat transferred from the motor or from other resistance heater means for raising the temperature of the thermostat metal means. Further, the heating effect of the resistance in the thermostat metal means has typically been needed for meeting the complex heating patterns required to provide the desired range of motor protection. As a result, the thermostat metal means has had to be connected in the motor circuit and the need for making electrical connection to the thermostat metal actuating means by electrical contacts or supports or the like has meant that the thermal response characteristics intially provided in the dished thermostat metal means had tended to be altered during protector assembly. This in turn has meant that calibration of the protector has usually been required after protector assembly for meeting motor protection requirements. Accordingly such motor protectors have typically had relatively complex and expensive structures and have usually required complex manufacturing and calibration processes. It would be desirable if the advantages of an inherent motor overload protector could be achieved utilizing a relatively less complex and less expensive motor protector device and a more convenient device assembly procedure while still meeting the demanding requirements of today's industry.

BRIEF SUMMARY OF THE INVENTION

It is an object of this invention to provide a novel and improved inherent motor protector; to provide such an improved protector which is particularly adapted for providing inherent overload protection for compressor motors as used in home refrigerator appliances; to provide an improved refrigerator compressor motor system having improved inherent motor overload protection; to provide such a motor protector and system having a relatively less complex and expensive structure; to provide a series of inherent motor protectors particularly adapted for refrigerator compressor motor systems wherein characteristics of the protectors in the series differ in selected increments so that protectors selected from the series are adapted for use in providing inherent overload protection for motors in refrigerator compressor systems likely to be encountered in a commercially recognized category such as home refrigerator appliances; and to provide such systems, particularly including systems with solid state PTC motor starters having resistance switching means of positive temperature coefficient of resistivity, where the protectors have improved reset times compatible with the reset times of the motor starters.

In this regard, it has now been recognized that protectors used in providing inherent motor overload protection for hermetically sealed refrigerator compressor motors in home refrigerator appliances (home refrigerators and freezers, home dehumidifiers, and refrigerators for water coolers and soft drink vending machines are typically included in this category) typically have short time (locked rotor) trip currents and ultimate (running overload) trip currents as commonly specified above with ratios of such currents in the range from 2.5 to 3.5 for certain motor systems and in the range from 3.5 to 4.5 for the remaining motor systems. That is, the current ratios are found to be in the lower range where the compressor motors are of the type operable at 110 volts requiring current-responsive motor starting using electromechanical motor starting relays or the like and are in the upper range where other starting relay means such as positive temperature coefficient resistance starter relays for split-phase motors or the like operable at 220 volts are used. It has also now been found that where the protector components are arranged in a particular way in accordance with this invention, such short time trip/ultimate trip current ratios are achieved in a novel and improved structure wherein a thermostat metal actuator means is disposed outside the motor winding circuit and where it is adapted to be precisely assembled in the protector to provide the desired inherent overload protection characteristics without requiring calibration of the protector after protector assembly or after incorporation in a refrigerator compressor motor system.

Briefly described, the novel and improved refrigerator compressor motor system having improved inherent motor protection as provided by this invention comprises an electrical motor and a refrigerator compressor operated by the motor hermetically sealed in a common shell, and a current and temperature responsive motor protector providing short time trip and ultimate trip protection for the motor. The systems include electromechanical motor starting relays or resistance starting relays of positive temperature coefficient of resistivity as may be desired. In accordance with this invention, the protector comprises base means, contact means mounted on the base means for relative movement between positions opening and closing the motor circuit, and thermostat metal means adapted to move from an original dished configuration to an inverted dished configuration with snap action when the thermostat metal means is heated to a selected actuation temperature. The thermostat metal means is adapted to return to its original dished configuration with snap action when it is subsequently cooled to a relatively lower reset temperature. The thermostat metal means is mounted on the base means of the protector to move the contact means between said circuit opening and closing positions in response to movement of the thermostat metal means between said dished configurations. In accordance with this invention, the thermostat metal means is thermally coupled in selected heat-transfer relation to the electrical motor but is located outside the motor circuits so motor current is not directed through the thermostat metal means. However resistance heater means responsive to motor current are arranged to transfer selected heat to the thermostat metal means in such a way as to cooperate with the thermal coupling of the thermostat metal means to the motor to provide both short time trip and ultimate trip protection for the motor.

In accordance with this invention the base means is of an electrical insulating material of relatively low thermal conductivity and has a recess therein. Preferably a boss of the base material of low thermal conductivity extends up into the recess to provide the base means with additional heat sink capacity. The heater means is disposed within the recess and preferably surrounds the boss of the base material provided in the center of the recess. In some embodiments, heater is preferably formed of a wire material such as nickel having a selected positive temperature coefficient of resistivity. The thermostat metal means comprises a round thermostat metal disc which is disposed in the recess on a recess shoulder to extend over the heater means in close thermal coupling to the heater means to be normally free of externally applied stress within the recess. The protector also includes fixed contact means which are mounted on the base means outside the recess and a resilient, movable contact arm which extends over the recess where it is adapted to normally retain the thermostat metal disc in the recess free of applied stress. The movable contact arm normally engages the fixed contact means for closing the motor circuit and the arm is movable by movement of the thermostat disc to its inverted dished configuration to disengage the arm from the fixed contact means to open the motor circuit. The movable contact arm also returns to its circuit closing position when the thermostat disc subsequently cools and snaps back to its original dished configuration. Terminal means electrically connected to the respective fixed and movable contact means extend from the base means for electrically connecting the motor protector in the electrical motor circuit. Preferably the recess in the protector base means has an end which opens at one side of the base, has a recess bottom and a side wall, has a shoulder in the side wall facing the open end of the recess, and has another opening in the recess side wall. That side of the base means also has grooves and reference surfaces formed therein for receiving and accurately positioning the heater means, thermostat metal means, contact means and terminal means of the protector in predetermined relation to each other on the base means.

In accordance with this invention, the heating capacity of the electrical heater means is regulated with respect to the thermal conductivity and capacity of the thermostat metal disc, the base means and the other protector components for providing the protector with a ratio of short time trip current (for short time of ten seconds) and ultimate trip current (stabilized) in the range from 2.5 to 4.5 where the effective protector ambient temperature is 65° C.. Preferably a series of such motor protectors is provided for use in refrigerator compressor motor systems for home refrigerator appliances to provide both short time trip and ultimate trip protection in such systems as are likely to be encountered, the series preferably having heaters with current ratings in the range from one to ten amperes wherein the current ratings of the individual heaters are separated by increments corresponding to about 5 percent of the current rating of the next lower heater current rating in the series and preferably having thermostat metal disc actuating temperatures in the range from about 90° C. to 160° C. separated in increments of about 5° C.. The thermal capacity of the protectors of the described structure are regulated for providing reset times for some of the protectors in a range the upper limit of which is at least greater than about 150 seconds for permitting use of the protectors in refrigerator compressor motor systems utilizing motor starters having resistance switching means of positive temperature coefficient of resistivity to be compatible with the reset times of such starters.

In this arrrangement, the protector bases, contacts, terminals, heaters and thermostat metal disc means are adapted for easy manufacture and assembly. The thermostat metal disc is not required to display any selected electrical resistivity and does not require any wide differential between its actuating and reset temperatures so it is easily manufactured to display precisely predetermined thermal response characteristics when it is free of externally applied forces. When the thermostat metal disc is then assembled in the protector, it does not have to be welded, clamped or pig tailed in any electrical circuit and is accordingly mounted on the protector base free of such such externally applied forces wherein it is adapted to display those precisely predetermined thermal response characteristics for opening and closing the motor circuit. Because the thermostat metal disc is not connected in the motor circuit, it is adapted to be disposed in close thermal coupling to a separate electrical resistance heater means and to be closely accommodated between the heater means and a resilient contact arm which is series connected with the heater means and at the same polarity as the heater means, thereby to move the contact arm between positions opening and closing the motor circuit without requiring heavy motion transfer means or the like. In that way, the thermostat metal disc is easily proportioned and thermally coupled relative to the motor and to the separate heater means to provide short time trip to ultimate trip current ratios in the range from 2.3 to 4.5 to meet the stringent requirements for use in refrigerator compressor motor systems for home refrigerator appliances and the like. The protectors are also adapted to display reset times in such motor systems which are compatible with use of the newer resistance types of motor starting relays having resistance switching means of positive temperature coefficient of resistivity which require significant periods of time for reset during system cycling while a fault condition persists. In addition, where the resilient contact arm in the protector is not subjected to creep type movement during heating and cooling of the thermostat metal means at temperatures below the actuating temperatures thereof, the resilience of the contact arm is easily selected to provide accurately predetermined contact pressures in the protector for achieving improved protector service life. Further the structure of the protector is adapted for precise accurate and inexpensive assembly for achieving the high quality standards required by today's industry.

DESCRIPTION OF THE DRAWINGS

Other objects, advantages and specific features of the novel and improved motor protector, motor protector series and refrigeration motor compressor systems of this invention appear in the following detail description of preferred embodiments of the invention, the detailed description referring to the drawings in which.

DESCRIPTION OF THE PREFERRED EMBODIMENTS

Figure 1:
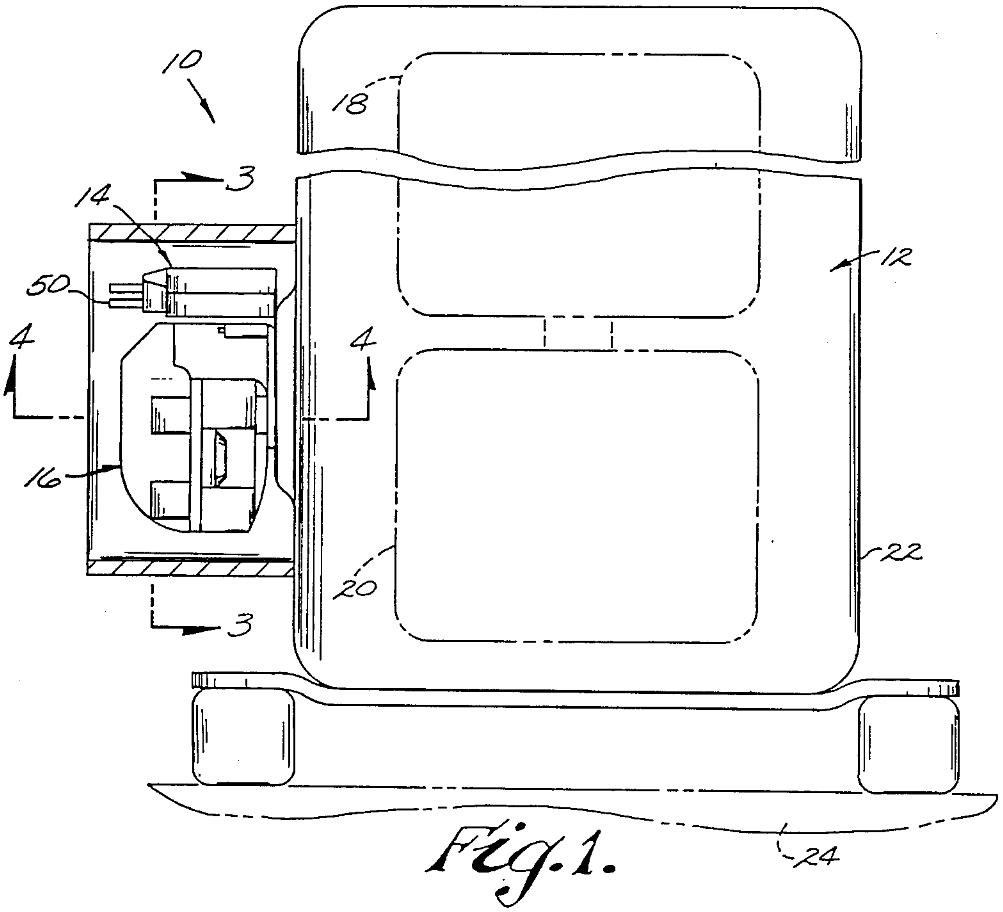
FIG. 1 is a diagrammatic side elevation view of a refrigerator compressor motor system according to this invention.
Figure 2:
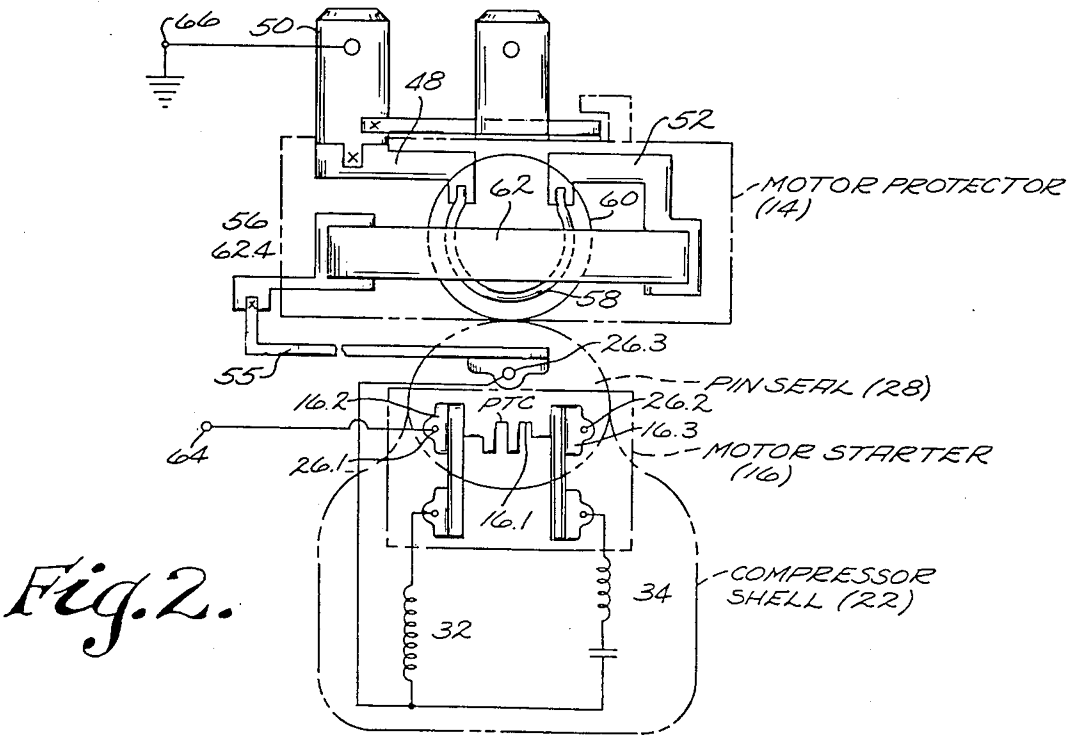
FIG. 2 is a schematic view illustrating electrical connection of components in the refrigerator compressor motor system of FIG. 1.

Referring to the drawings, 10 in FIGS. 1–4 indicates a refrigerator compressor motor system which is shown to include a conventional sealed compressor unit 12, a motor protector 14 as provided by this invention, and a conventional PTC motor starting means 16. The sealed compressor unit incorporates a conventional electrical motor 18 and a refrigerator compressor 20 operated by the motor which are hermetically sealed in a common metal shell 22. The unit is mounted in any conventional manner in any home refrigerator appliance (as defined above) for example as is diagrammatically illustrated at 24 in FIG. 1. Thermally and electrically conductive lead-through pins 26.1, 26.2 and 26.3 are electrically insulated from the shell and from each other by glass seal means 28 or the like to extend in sealed relation through the shell to make electrical connection to the windings of the electrical motor in the shell. Typically the motor includes a main winding 32 and a start winding 34 which are connected at one end to the respective pins 26.1, 26.2 and which are connected in common at their opposite ends to the pin 26.3 as is schematically shown in FIG. 2. The motor starting means 16 is is of any conventional type within the scope of this invention but in one preferred embodiment discussed further below comprises a solid state motor starter having resistance switching means 16.1 of a positive temperature coefficient of resistivity (PTC). As such a motor starter is described in U.S. Pat. No. 4,241,370 incorporated herein by this reference, that starter is not further described herein and it will be understood that any conventional solid state or electromechanical motor starting relay is used in the system 10 within the scope of this invention. The motor protector 14 provides inherent motor overload protection for the motor 18 and for that purpose is mounted on the lead-through pin 26.3 in the illustrated manner to be disposed in selected thermally coupled relation to the motor 18 as is described in U.S. patent application Ser. No. 551,619 filed Nov. 14, 1983 now U.S. Pat. No. 4,499,517 and as is further described below.

The refrigerator compressor motor system 10 preferably incorporates a fractional horsepower motor 18, such motors with ratings in the range from 1/20 to ⅓ horsepower being typically used in home refrigerator appliances. The protector 14 is adapted to provide inherent motor overload protection to protect against overheating under either short time trip or ultimate trip motor fault conditions as specified for example in Table I:

TABLE I

| Type of Protector | Maximum Compressor Shell Temperature |
|---|---|
| Automatically Reset | 150° C. |

TABLE I-continued

A. Application to d.c. and a.c. single phase motors rated at 1 HP or less at 110–115 or 220–230 v.
B. Performance tests pursuant to Underwriter's Laboratory Standard UL 984 dated June 13, 1984.
C. The protector shall operate for 15 days on locked rotor endurance test with the motor with which it is to be applied without exceeding the above-noted shell temperature and without permanent injury to the motor.

Figure 8:
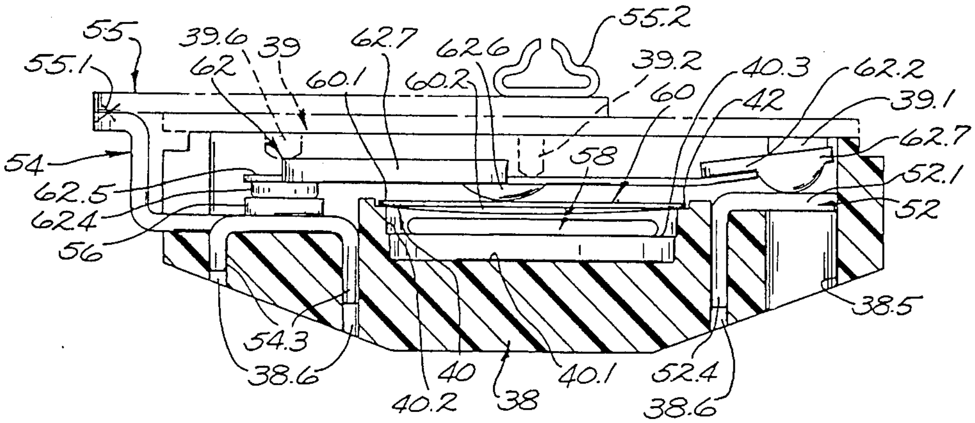
FIG. 8 is a section view along line 8—8 of FIG. 7.

In accordance with this invention, the motor protector 14 includes a housing comprising a base or body 38 and a cover 39 which are molded or otherwise formed of an electrically-insulating, glass-filled nylon material or the like having a relatively low thermal conductivity. See FIGS. 1–4. Thermally and current responsive switching means are disposed within the housing and the housing is particularly adapted for mounting on a refrigerator compressor unit with any conventional starting means 16 being used in the system in the manner described in the patent application Ser. No. 551,619 now U.S. Pat. No. 4,499,517 noted above. The base has a recess 40 opening at one side 38.1 of the base as shown in FIG. 5. The recess has has a bottom 40.1 and a side wall 40.2 and a shoulder 42 in the side wall faces the open end of the recess. A first reference surface 44 is located on the base side 38.1 at one side of the recess and a second reference surface 46 is located on the same base side at the opposite side of the recess. If desired, ridges 40.3 form locating surfaces on the recess bottom. An opening 40.4 in the recess side wall communicates with a groove or channel 38.2 formed in the base side 38.1 and preferably additional grooves 38.3, 38.4 are located in predetermined relation to each other and to the recess 40. Preferably access openings 38.5 are located in the groove 38.2 near the recess side wall opening 40.4 and in the reference surface 46 while conductor mounting and locating holes 38.6 are provided in the groove 38.2 and in the reference surfaces 44 and 46. Preferably a ridge 38.7 extends around part of the base perimeter to cooperate with a corresponding ridge (not shown) on the cover 39 to facilitate mounting of the cover and, if desired, locating pins 39.1 on the cover (one is shown in FIG. 8) fit into locating holes 38.8 in the base. Slots 38.9 in the base ridge communicate with the grooves 38.2 and 38.4 In an alternate embodiment illustrated in FIG. 9 (wherein corresponding features are identified with corresponding numerals), a boss 47 of the base material is formed, preferably integral with the base by molding or the like, in the center of the recess bottom upstanding from the bottom so the boss periphery 47.1 is spaced from the recess side wall 40.2 and so that the boss increases the thermal capacity of the base at a location within the base recess. In that construction, the base or body 38 is easily formed by molding or the like and where the recess, recess shoulder, reference surfaces and grooves and the like are all formed in the same base side they are easily formed in precisely predetermined locations relative to each other.

Figure 6:
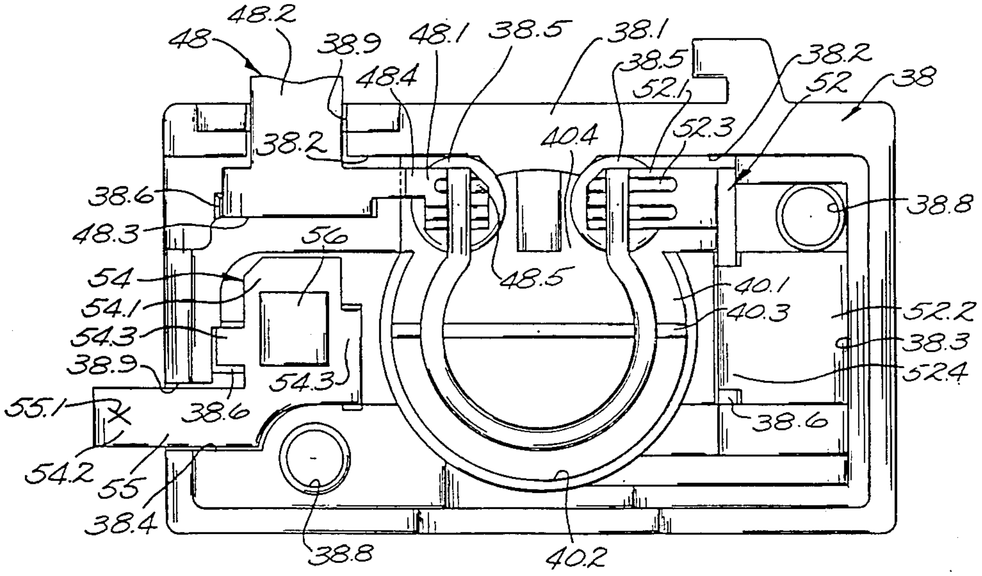
FIG. 6 is a partial plan view similar to FIG. 5 to enlarged scale illustrating mounting of some protector components in the base of FIG. 5.

As shown in FIG. 6, a first electrical conductor member 48 of cold roll steel or the like is disposed in the groove 38.2 with one end 48.1 extending over an access opening 38.5 near the recess side wall opening 40.4 and with its opposite, terminal end 48.2 extending from the groove through a slot 38.9. A tab 48.3 is fitted into a terminal locating hole 38.6 and is staked (bent or bifurcated or the like in conventional manner) in the hole for securing the conductor member 48 in a selected location in the groove. Preferably the member has a portion 48.4 of limited cross section selected for limiting heat-transfer through the member and that portion is preferably bent to accommodate it in the groove 38.2 as shown. An exterior terminal 50 is preferably welded to the terminal end 48.2 as indicated at 50.1 in FIG. 7 and weld projections such as ribs 48.5 are preferably provided on the member end 48.1. A second electrical conductor member 52 is also disposed in part of groove 38.2 with one end 52.1 extending over a corresponding access opening 38.5 near the recess side wall opening 40.4 and with its opposite end 52.2 extending into the groove 38.3 over the reference surface 46 and over the window 38.5 in that reference surface. This conductor member has weld projections 52.3 at said one end and has a tab 52.4 fitted into and staked in a mounting hole 38.6 for securing the conductor member on the base 38. A third electrical conductor member 54 is disposed in the groove 38.3 with one end 54.1 disposed over the reference surface 44 and with an opposite, terminal end 54.2 extending from the groove through a slot 38.9. A pair of tabs 54.3 fit into and are staked within mounting holes 38.6 for securing the conductor member to the base. An exterior terminal 55 is preferably welded to the terminal end 54.2 after mounting of the cover 39 as indicated at 55.1 in FIGS. 2 and 4. Preferably the conductor member 54 has a substantial cross sectional size extending out through the slot 38.9 as illustrated for providing the member with substantial thermal conductivity as will be discussed below. In that construction, the conductor members are easily mounted on the base 38 and are precisely located relative to the base and each other by the grooves, reference surfaces and mounting holes.

In accordance with the invention, a first or stationary electrical contact 56 is electrically connected to the conductor member 54, preferably by being soldered, brazed or welded to the member to be located at a precisely predetermined position on the base 38 outside the recess 40 at one side of the recess as determined by the reference surface 44, the groove 38.3, and the locating holes 38.6.

Figure 9:
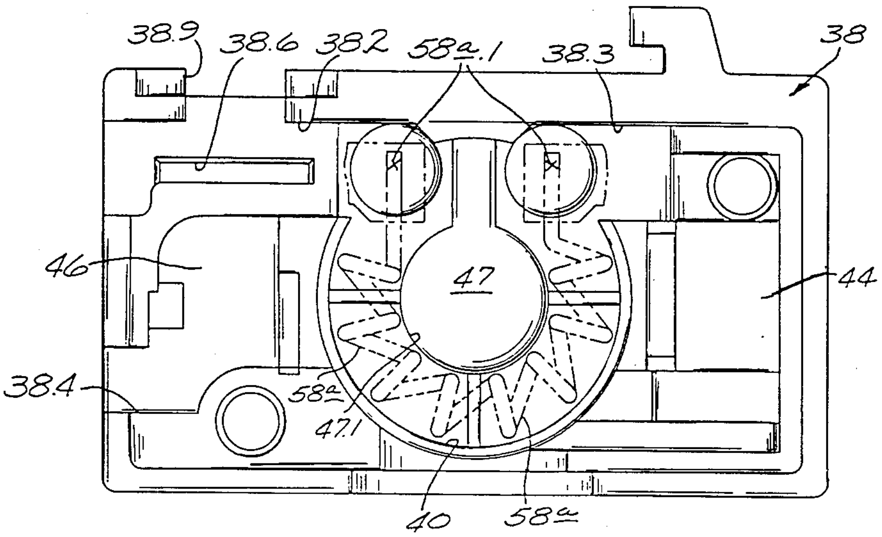
FIG. 9 is a partial plan view similar to FIG. 5 illustrating the base of an alternate embodiment of the protector of this invention.
Figure 10:
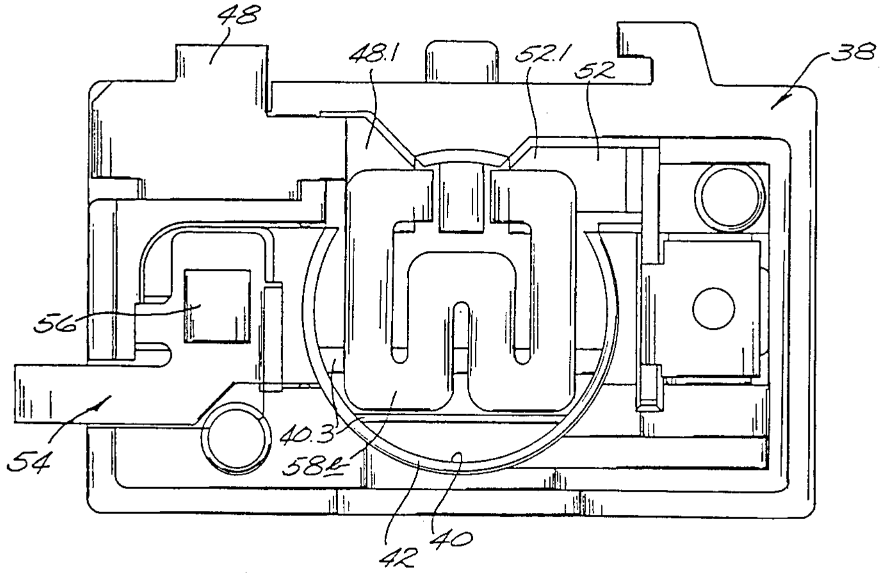
FIG. 10 is a partial plan view similar to FIG. 6 illustrating mounting of some protector components in another alternate embodiment of the protector of this invention.

In accordance with this invention, an electrical resistance heating means is disposed in the recess 40 located on the recess bottom against the locating surfaces 40.3. Preferably the heating means comprises a loop of nichrome or other electrical resistance heating wire or the like which is arranged to extend around the circumference of the recess 40 so that opposite ends of the loop extend over the ends 48.1, and 52.1 of electrical conductors, the heater ends preferably being resistance welded to the respective conductor member ends by means of the weld projections 48.5 and 52.3 where access to the members and heater ends for making the welds is obtained using the access openings 38.5. In one preferred embodiment of the invention discussed further below, the heater wire 58 is formed of nickel and has a positive temperature coefficient of resistivity such that the resistance of the material increases up to about six times as the temperature of the wire is increased by self-heating or the like. In an alternate embodiment of the invention as illustrated in FIG. 9, the heater wire is wound in an helical coil 58*a* and that coil is looped around the boss 47 provided on the base in close heat-transfer relation to that boss, the boss and coil preferably being proportioned as shown so that the coil fits snugly around the boss and tends to be retained in position on the recess bottom by the boss. In alternate embodiments of the invention, the heater means 58 is also adapted to be connected to the conductor member ends by laser welds as indicated at 58*a*.1 in FIG. 9. In another alternate embodiment of this invention as illustrated in FIG. 10 (wherein corresponding features are identified by corresponding reference numerals), the heater means 58*b* is blanked from a sheet of electrical resistance material to be looped within the base recess 40.

Figure 7:
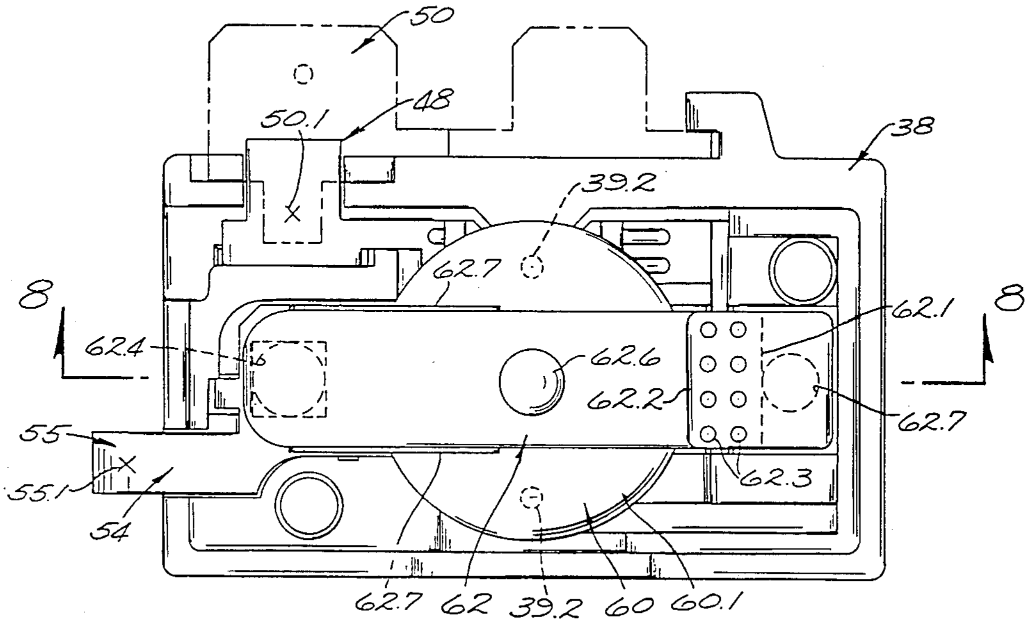
FIG. 7 is a partial plan view similar to FIG. 6 illustrating mounting of other protector components in the structure illustrated in FIG. 6.

In accordance with this invention as shown in FIGS. 7 and 8, a thermostat metal disc member 60 is disposed in the base recess with the disc perimeter 60.1 resting on the recess shoulder 42 so the disc extends over the heater 58 in closely spaced and predetermined thermally coupled relation to the heater. The thermostat disc preferably comprises a round dished member of a multilayer thermostat metal which is normally disposed in the recess 40 in an original, concavo-convex dished configuration with a convex side 60.2 of the disc facing toward the heater as illustrated in FIG. 8 but which is adapted to move to an inverted dished configuration with snap action when the disc is heated to a precisely predetermined actuating temperature while the disc is substantially free of externally applied forces. The thermostat metal disc is also adapted to return its original dished configuration with snap action when the disc is subsequently cooled to a relatively lower reset temperature. As illustrated, the thermostat disc is disposed in the recess to be normally free of externally applied forces so it is adapted to be actuated when heated to that precisely predetermined actuating temperature.

In accordance with this invention, a resilient, electrically conductive, movable contact arm 62 is arranged with one end 62.1 mounted at an opposite side of the base recess 40 so that the arm extends across the open end of the recess and beyond the recess to normally engage the first or complementary stationary contact 56 located outside the base recess. Preferably for example the movable contact arm 62 is formed of a copper spring material or the like adapted to provide a relatively low spring rate, a weld slug or plate 62.2 is secured to the arm end 62.1 by a plurality of resistance weld projections 62.3 or the like, a movable electrical contact 62.4 is secured to the arm at an opposite end 62.5 of the arm, a protuberance or dimple 62.6 is provided in the arm intermediate its ends, and stiffening ribs 62.7 are raised from the arm along the length of the arm between the dimple 62.6 and the movable contact arm end 62.5. The arm is then welded to the electrical conductor 52 by use of a resistance weld projection 62.7 or the like as shown in FIG. 8 so that the dimple 62.6 faces the thermostat disc 60 but does not normally assert any externally applied force on the thermostat disc. The access window 38.5 facilitates forming the weld at 62.7 and a laser weld can be used if preferred. In that arrangement, the contact arm is precisely located to extend over the thermostat disc to engage the movable contact 62.4 with the complementary contact 56 in a closed circuit position and the dimple is precisely located relative to the disc within the recess. The contact pressure between the contacts 62.4 and 56 is easily adjusted by applying an adjusting, bending force to the conductor 52 through the access window 38.5 in the reference surface 46 and, because the arm has a low spring rate and does not normally apply any force to the disc, this contact pressure adjustment is easily made to achieve high contact closing pressures if desired without risk of altering the thermal actuating temperature characteristics of the thermostat disc. The noted location of the stiffening ribs 62.7 assures that undesired flexing of the arm is avoided between the dimple and the movable contact 62.4. As noted, the arm 62 is precisely located relative to the disc 60 and the disc is precisely located relative to the heater by the described structure and the heater and contact arm are electrically connected in series relation to be at the same electrical polarity. Accordingly the disc and heater are easily accommodated in the recess under the arm to be in close relation to achieve desired thermal coupling and to permit the disc to reliably engage the dimple to move the arm to an open circuit position separating the contact 62.4 and 56 when the disc is actuated to move to its inverted dished configuration. Where the heater is a sheet material as shown in FIG. 10 its spacing to the thermostat disc is very small for achieving very effective heat transfer even though the heater rating is viewed by substituting a heater of different serpentine length, that close spacing is reliably retained. As will be seen the position of the arm 62 over the recess also serves to retain or capture the thermostat disc in the recess to retain it in the desired close thermal coupling to the heater 58.

In a preferred embodiment of the invention, the cover 39 is cemented or otherwise secured to the base 38 using the ridge 38.7 and the pins 39.1 in locating holes 38.8 and the like. Preferably additional cover pins 39.2 (see FIGS. 7 and 8) depend down from the cover into the base recess at respective sides of the contact arm 62 to terminate adjacent peripheral portions of the thermostat disc, thereby to retain the disc in an even more precise thermal coupling and position relative to the heater 58 and arm 62 without normally asserting any externally applied forced on the disc. If desired an additional cover pin 39.5 is arranged to depend down to a position in selected spaced relation over the end of the contact arm 62 carrying the movable contact 62.4 to serve as a stop for limiting movement of the arm in opening the motor circuit, thereby to eliminate bouncing of the arm after opening the circuit.

Figure 3:
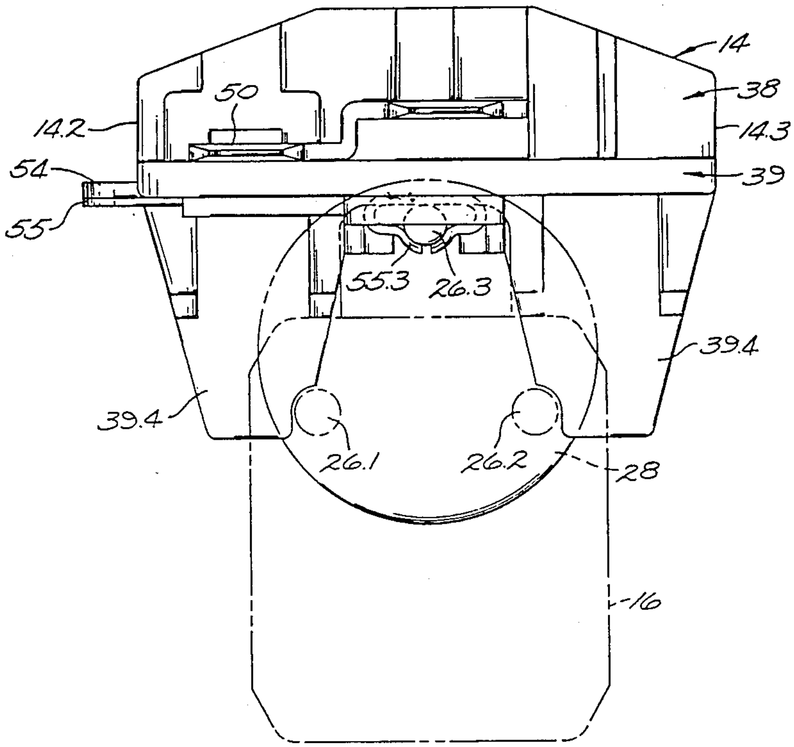
FIG. 3 is a partial side elevation view of the system of FIG. 1 as viewed along line 3—3 of FIG. 1 including a plan view of the protector incorporated in the system.
Figure 4:
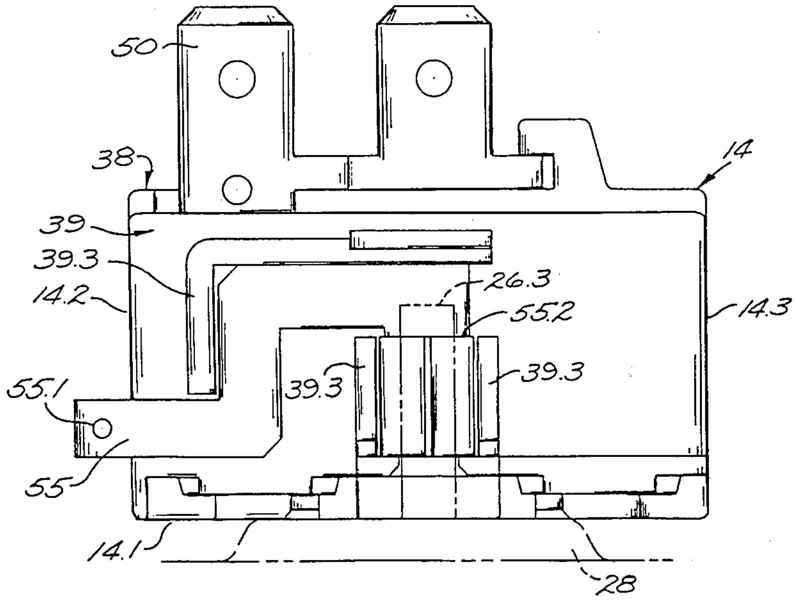
FIG. 4 is a side elevation view of the protector of FIG. 3 illustrating the protector as viewed along line 4—4 of FIG. 1.
Figure 5:
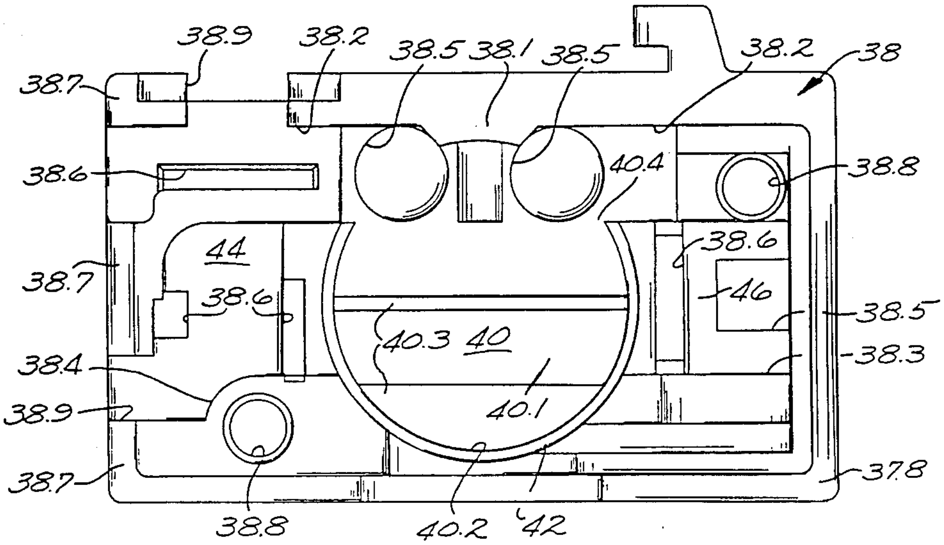
FIG. 5 is a partial plan view similar to FIG. 4 illustrating the base of the protector of FIG. 4 with other protector components removed.

As is best shown in FIG. 4, ridges 39.3 are also preferably provided on the outer side of the cover to define a channel or groove for positioning, supporting and thermally isolating the exterior terminal 55 on the cover outside the cover. As shown, the exterior terminal 55 has a resilient female compression clip 55.2 arranged at one end so the axis of the female clip extends from the top to the bottom of the protector 14 (as viewed in FIG. 4). The clip is therefore adapted to be received axially over the lead-through pin 26.3 for securely gripping the pin to mount the protector 14 with selected thermal coupling to the electrical motor 18 via the terminal 55 and conductor member 54 and with selected spacing from the compressor unit shell 22 as proposed in the patent application Ser. No. 551,619 now U.S. Pat. No. 4,499,517 noted above. The protector cover 39 also preferably has thin tab means 39.4 which are molded integral with the cover of the electrical and thermal insulating material of the cover, which extend from the cover adjacent a bottom edge 14.1 of the protector (see FIG. 4) to extend toward and abut the other lead-through pins 26.1, 26.2 for preventing rotation of the protector on the pin 26.3 and for cooperating with the pin 26.3 in locating the protector in a precisely predetermined position on the compressor unit where it will have a precisely predetermined thermal coupling to the compressor motor 18. Preferably the tab means comprises a pair of tabs spaced from each other at respective ends 14.2 14.3 of the protector to engage portions of the pins 26.1, 26.2 facing away from each other. In that arrangement, the tabs are adapted to be more universally accommodated under motor starting means 16 of various different designs where the position of the starting means over the tabs assures retention of the protector on the compressor while also tending to minimize the thermal effect such tabs may have with respect to the motor starting means and the like relative to the compressor unit. Preferably the distal ends of the tabs have guide grooves 39.6 formed in the respective tab means in facing relation to each other facing generally away from the housing for slidably engaging the respective lead-through pins 26.1, 26.2 as shown in FIG. 3. In that arrangement it is found that, when mounting the protector on the pin 26.3 where that pin may not be visible to the person mounting the protector, the guide grooves 39.6 are easily positioned slidably against the pins 26.1, 26.2 and serve to guide the female clip 55.2 smoothly and assuredly onto the pin 26.3 for facilitating mounting of the protector for mounting the starter over the protector cover tabs 39.4 and over the end of the pin 26.3 for securing the protector in a precise location on the compressor unit. One starter terminal 16.3 is electrically connected to a power source schematically illustrated at 64 in FIG. 2 while one extension 50.2 of the double, exterior terminal 50 is connected to electrical ground as illustrated at 66 in FIG. 2. In that arrangement, the initial motor circuit extends through the pin 26.1 to the main winding 32 and through the pin 26.2 and starter resistance 16.1 to the start winding 34, the opposite ends of those windings being connected to the pin 26.3. The motor circuit then extends through exterior terminal 55, conductor 54, first contact 56, movable contact 62.4, contact arm 62, conductor 52, heater 58, conductor 48 and exterior protector terminal 50 to electrical ground for energizing the motor windings 32 and 34 to start the motor.

As motor starting occurs, the starter resistance sharply increases and effectively deenergizes the start winding 34 and also provides protection against overloading of the start winding as will be understood. If no motor fault condition occurs, the normal motor currents in the winding 32 are directed through the protector heater 58 and the protector circuit remains closed, the heater being proportioned so that the combined heating effect of such currents in the heater and of thermal coupling of the protector to the motor is insufficient to heat the thermostat metal disc to its actuating temperature for opening the protector circuit. However if selected overheating of the motor should occur or if a fault condition in the motor or compressor unit should result in a selected overload current being directed through the heater 58, the combined heating effect of the heater and the thermal coupling of the protector to the motor heats the thermostat disc to its actuating temperature and opens the protector circuit to deenenergize the motor and protect against overheating. That is, if an ultimate trip motor fault condition occurs, a small increase in motor temperature and relatively small overload current being directed through the heater 58 cooperate over a substantial period of time until the thermostat disc is heated to its actuating temperature for deenergizing the motor. Alternately if a short time trip motor fault condition such as a locked rotor condition should occur, a sharp increase in current is directed through the heater 58 and cooperates with the thermal coupling to the motor to deenergize the motor before heating damage can occur to the motor. On deenergizing of the motor, energizing of the heater is also interrupted but the heater material and other protector components retain a substantial amount of heat within the protector for a substantial period of time for retaining a thermostat metal disc above its reset temperature for a substantial period of time even if the reset temperature has been selected to be somewhat high to facilitate manufacture of the disc or the like. Where the protector base has a boss 47 located within the base recess as shown in FIG. 9, heat transfer from the boss to the disc 60 continues for an even more substantial period of time after the heater 58 is deenergized. Then when the disc cools to its reset temperature it returns to its original dished configuration with snap action permitting the arm 62 to resiliently return into closed circuit position for reenergizing the motor. In this way, the motor protector is adapted to cycle the motor on and off for a substantial period of time to protect the motor against damage due to overheating while permitting time for operator intervention to correct any motor fault condition which may exist.

In accordance with this invention, the components of the motor protector as thus constructed are particularly adapted to be regulated relative to each other for providing a series of motor protectors having thermal response and reset characteristics such that individual protectors selected from the series are adapted to be used for providing protection for any electrical motor likely to be encountered within a particular group or category of electrical motor applications. That is, the heating capacity of the heaters are regulated with respect to thermal capacity of the protector components and the actuating and reset temperatures of the disc 60 to provide the protectors with selected thermal response and reset characteristics. Preferably for example, the heaters 58 used in the protectors in the series have current ratings arranged from about one to ten amperes with the current ratings of the respective protectors in the series separated from each other by increments corresponding to about 5 percent of the heater current rating of the protector with the next lowest heater current rating in the series. The thermostat metal disc members in the series have actuating temperatures in the range from about 90° to 160° C. separated from each other by increments of about 50° C. or the like. Preferably the discs have reset temperatures not less than about 52° C. The proportions of the protector components are then regulated relative to each other and to the selected thermal coupling to the motor to provide each protector with a ratio of short time trip current to ultimate trip current for a short trip time of ten seconds in the range from 2.3 to 4.5 where the effective protector ambient is 65° C. Preferably the protector series includes one group having such a ratio in the range from 2.3 to 3.5 for use with 110–115 volt motors using electromechanical motor starting relays and another group in the range from 3.5 to 4.5 for use with 220–230 volt motors using solid state PTC resistance switch motor starting relays. Preferably the protector components are regulated to provide reset times after short time tripping in the range from about 30 to 150 or more seconds. As thus provided, the series of motor protectors is adapted to provide inherent motor overload protection including both ultimate trip and short time trip protection for any motors likely to be encountered in refrigerator compressor motor systems used in home refrigerator appliances. Alternately the proportions of the protectors are regulated for use in other motor protector appliances as may be desired.

Where the motor starting means 16 comprises a solid state motor starter having resistance switching means 16.1 of positive temperature coefficient resistivity as previously described, the proportions of the protector components are preferably regulated as described so that the protectors have reset times of at least about 150 seconds duration or the like to exceed the reset times of such starters are likely to be encouraged in the intended motor application category.

Alternately, where the heater 58 is formed of a nickel material or the like having a positive temperature coefficient of rresistivity as above described, the heater resistance increases in proportion to the increase in motor current and is particularly adapted for achieving short trip times. In that regard, the heater proportions are preferably selected with respect to such temperature coefficient characteristics to display a first relatively low electrical resistance when a normal motor running current is directed through the heater, to display a second relatively higher electrical resistance in response to a relatively higher ultimate trip current being directed through the heater, and to display a third substantially much higher electrical resistance when a sharply increased, short time trip current is directed through the heater, those heater proportions being selected with respect to the thermal coupling to the motor to facilitate matching of the protector characteristics to selected motors to be used with protectors for providing short time trip and ultimate trip protection for the motors. Such PTC nickel wire heaters are particularly useful in providing motor protectors of this structure having the relatively low short time trip/ultimate trip current ratios on the order of about 2.5 and for achieving short time trip times of substantially less than 10 seconds or even in the order of about 3 seconds as applied to particular motors.

It should be understood that although particular embodiments of the systems and protectors of this invention are described for illustrating the invention, the invention includes all modifications and equivalents of the disclosed embodiments falling within the scope of the appended claims.

We claim:

1. A current and temperature responsive motor protector to be mounted in a selected manner on an electrical motor for providing both short time trip and ultimate trip protection for the motor comprising a base, first contact means on the base normally engaging complementary contact means to close a motor circuit, the first contact means being movable to disengage the complementary contact means to open the circuit, thermostat metal means mounted on the base to be disposed in selected thermal coupling to the motor when the protector is mounted on the motor in said manner, the thermostat metal means being actuatable when heated to a selected temperature to move the first contact means to open the circuit, and electrical resistance heater means responsive to increases in motor current on the occurrence of either short time trip or ultimate trip fault conditions in the motor for heating the thermostat metal means to said selected temperature, characterized in that the electrical resistance heater means is formed of a material having a positive temperature coefficient of resistivity arranged to carry the motor current, the material of the heater means being selected to display a first electrical resistance in response to normal motor currents in the heater means, a second relatively higher electrical resistance in response to ultimate trip motor current in the heater means, and a third substantially higher electrical resistance in response to short time trip motor current in the heater means, the heater means being proportioned and arranged with selected thermal coupling to the thermostat metal means to cooperate with the positive temperature coefficient of resistivity and the thermal coupling of the thermostat metal means to the motor to display said first resistance and permit normal running operation of the motor in response to normal motor currents in the heater means, to display said second resistance and heat the thermostat metal means to said selected temperature in response to ultimate trip currents in the heater means, and to display said third resistance and heat the thermostat metal means to said selected temperature in response to short time trip current in the heater means.

2. A current and temperature responsive motor protector to be mounted in a selected manner or an electrical motor for providing both short time trip and ultimate trip protection for the motor comprising a base, first contact means on the base normally engaging complementary contact means to close a motor circuit, the first contact means being movable to disengage the complementary contact means to open the circuit, thermostat metal means mounted on the base to be disposed in selected thermal coupling to the motor when the protector is mounted on the motor in said manner, the thermostat metal means being actuatable when heated to a selected temperature to move the first contact means to open the circuit, and electrical resistance heater means responsive to increases in motor current on the occurrence of either short time trip or ultimate trip fault conditions in the motor for heating the thermostat metal means to said selected temperature, characterized in that the thermostat metal means comprises a dished thermostat metal member movable with snap action from an original dished configuration an inverted dished configuration when heated to a precisely predetermined actuating temperature while substantially free of externally applied forces, the member being mounted on the base unattached to any support to be substantially free of such externally applied forces prior to initiation of said snap action and having one side of the member disposed to engage and move the first contact means to open the circuit as the member moves when heated to said precisely predetermined actuating temperature, the member being mounted out of the motor circuit so motor current does not pass through the member, and separate electrical resistance heater means are arranged in closely spaced relation to an opposite side of the thermostat metal member with selected thermal coupling to the thermostat metal member, the electrical resistance heater means being formed of a material having a positive temperature coefficient of resistivity arranged to carry the motor current, the material of the heater means being selected to display a first electrical resistance in response to normal motor currents in the heater means, a second relatively higher electrical resistance in response to ultimate trip motor current in the heater means, the heater means being proportioned and arranged with selected thermal coupling to the thermostat metal means to cooperate with the positive temperature coefficient of resistivity and the thermal coupling of the thermostat metal means to the motor to display said first resistance and permit normal running operation of the motor in response to normal motor currents in the heater means, to display said second resistance and heat the thermostat metal means to said selected temperature in response to ultimate trip currents in the heater means, and to display said third resistance and heat the thermostat metal means to said selected temperature in response to short time trip current in the heater means, in closely spaced relation to an opposite side of the thermostat metal member.

3. A motor protector according to claim 2 wherein the base comprises a thermally and electrically insulating body having a recess open at one end, the heater means and thermostat metal member are arranged in closely spaced relation to each other within the recess to achieve said selected thermal coupling between the member and the heater means, the first contact means comprises a resilient electrically-conductive movable contact arm electrically connected in series to the heater means to be at the same polarity as the heater means in open and closed circuit positions, the arm having one end secured to the body at one side of the recess and having its opposite end extending across the open recess end to an opposite side of the recess, and the complementary contact means is mounted on the body at said opposite side of the recess to normally engage the movable contact arm for closing the motor circuit, the complementary contact means being mounted outside the recess to assure provision of proper electrical spacing from the heater means when the complementary contact means are of opposite polarity to the heater means while the motor circuit is open, the arm being disposed in selected closely spaced relation to the thermostat metal member in the recess so that the arm extending across the recess is positively moved to open circuit position when the member moves with snap action to its inverted dished configuration in response to being heated to its predetermined actuating temperature, further characterized in that the heater means comprises an electrical resistance heater element arranged in a loop within the recess to extend around the recess to provide a substantial heating capacity in the recess in closely spaced, heat-transfer relation to the thermostat metal member in the recess, the heater means having selected heating capacity and thermal coupling to the thermostat metal disc to provide the protector with a ratio of short time trip current to ultimate trip current for a short trip time of 10 seconds in the range from 2.5 to 3.5 where the effective protector ambient is 65° C.

4. A motor protector according to claim 3 wherein the thermostat metal member is adapted to return to its original dished configuration with snap action when subsequently cooled to a relatively lower reset temperature for permitting the first contact means to reengage the complementary contact means to reclose the the motor circuit, further characterized in that the thermal capacity of the protector is regulated with respect to thermal coupling of the thermostat metal member to said heater means to provide the protector with short trip times in the range from 3 to 10 seconds in response to short time trip motor fault currents in the heater element in selected motor applications.

5. A motor protector according to claim 1 wherein the heater means comprises a flat sheet of electrical resistance material blanked to provide a serpentine length of the resistance material, the heater sheet being disposed with a flat side thereof extending over the bottom of the body recess in precisely predetermined electrical spacing to the thermostat metal member arranged in the recess.

6. A protected refrigerator compressor motor system for a home refrigerator appliance comprising an electrical motor and a refrigerator compressor operated by the motor hermetically sealed in a common shell, a motor starter, and a current and temperature responsive motor protector fro providing short time trip and ultimate trip protection for the motor, wherein the system incorporates a current and temperature responsive motor protector to be mounted in a selected manner on the electrical motor for providing both short time trip and ultimate trip protection for the motor comprising a base, first contact means on the base normally engaging complementary contact means to close a motor circuit, the first contact means being movable to disengage the complementary contact means to open the circuit, a thermostat metal means mounted on the base to be disposed in selected thermal coupling to the motor when the protector is mounted on the motor in said manner, the thermostat metal means being actuatable when heated to a selected temperature to move the first contact means to open the circuit, and electrical resistance heater means responsive to increases in motor current on the occurrence of either short time trip or ultimate trip fault conditions in the motor for heating the thermostat metal means to said selected temperature, characterized in that the thermostat metal means comprises a dished thermostat metal member movable with snap action from an original dished configuration to an inverted dished configuration when heated to a precisely predetermined actuating temperature while substantially free of externally applied forces, the member being mounted on the base unattached to any support to be substantially free of such externally applied forces prior to initiation of said snap action and having one side of the member disposed to engage and move the first contact means to open the circuit as the member moves when heated to said precisely predetermined actuating temperature, the member being mounted out of the motor circuit so motor current does not pass through the member, separate electrical resistance heater means are arranged in closely spaced relation to an opposite side of the thermostat metal member with selected thermal coupling to the thermostat metal member, the electrical resistance heater means being formed of a material having a positive temperature coefficient of resistivity arranged to carry the motor current, the material of the heater means being selected to display a first electrical resistance in response to normal motor currents in the heater means, a second relatively higher electrical resistance in response to ultimate trip motor current in the heater means, and a third substantially higher electrical resistance in response to short time trip motor current in the heater means, the heater means being proportioned and arranged with selected thermal coupling to the thermostat metal means to cooperate with the positive temperature coefficient of resistivity and the thermal coupling of the thermostat metal means to the motor to display a said first resistance and permit normal operation of the motor in response to normal motor currents in the heater means, to display said second resistance and heat the thermostat metal means to said selected temperature in response to ultimate trip currents in the heater means, and to display the third resistance and heat the thermostat metal means to said selected temperature in response to short time trip current in the heater means, the base comprises a thermally and electrically insulating body having a recess opening at one end, the heater means and thermostat metal member are arranged in closely spaced relation to each other within the recess to achieve said selected thermal coupling between the member and the heater means, the first contact means comprises a resilient electrically-conductive movable contact arm electrically connected in series to the heater means to be at the same polarity as the heater means in open and closed circuit positions, the arm having one end secured to the body at one side of the recess and having its opposite end extending across the open recess end to an opposite side of the recess, and the complementary contact means is mounted on the body at said opposite side of the recess to normally engage the movable contact arm for closing the motor circuit, the complementary contact means is being mounted outside the recess to assure provision of proper electrical spacing from the heating means when the complementary contact means are of opposite polarity to the heater means while the motor circuit is open, the arm being disposed in selected closely spaced relation to the thermostat metal means in the recess so that the arm extending across the recess is positively moved to open circuit position when the member moves with snap action to its inverted dished configuration in response to being heated to its predetermined actuating temperature, the heater comprising an electrical resistance heater element arranged in a loop within the recess to extend around the recess to provide a substantial heating capacity in the recess in closely spaced, heat-transfer relation to the thermostat metal member in the recess, the heater means having selected heating capacity and thermal coupling to the thermostat metal disc to provide the protector with a ratio of short time trip current to ultimate trip current for short trip time of 10 seconds in the range from 2.5 to 3.5 where the effective protector ambient is 65° C., and the thermostat metal member being adapted to return to its original disc configuration with snap action when subsequently cooled to a relatively lower reset temperature for permitting the first contact means to re-engage the complimentary contact means to reclose the motor circuit, the thermal capacity of the protector being regulated with respect to thermal coupling of the thermostat metal member to said heater means to provide the protector with short trip times in the range from 3 to 10 seconds in response to short time trip motor fault currents in the heater element in selected motor applications.

7. A motor protector comprising a molded-thermally and electrically insulating body having a recess open at one side of the body, the recess having a bottom an a side wall and having a shoulder in the side wall facing the open recess end, an electrical resistance heater arranged in a loop in the recess located against the recess bottom extending around a circumference of the recess to be connected in a motor circuit to carry the motor current, a round, dished thermostat metal disc adapted to move from an original dished configuration to an inverted dished configuration with snap action when heated to an actuating temperature and to return to its original dished configuration with snap action when subsequently cooled to a relatively lower reset temperature, the member being disposed in the recess on the shoulder over the heater with selected thermal coupling to the heater, a first contact mounted on the body at one side of the recess to be connected in the motor circuit, and a resilient movable electrically conductive spring contact arm electrically connected to the heater to be electrically connected in the motor circuit to be at the same polarity as the heater in that circuit, the arm having one end mounted on the body at an opposite side of the recess to extend across the open recess end to normally engage an opposite end with first contact for energizing the motor during normal motor operation, to be moved to disengage the first contact and interrupt motor operation when the disc is heated to said actuating temperature by occurrence of either of short time trip and ultimate trip motor fault currents in the heater, and to reengage the first contact for reenergizing the motor when the disc cools to said reset temperature, characterized in that the body recess has an opening in the side wall thereof, a first electrical conductor member is mounted on the body having one end disposed adjacent the recess side wall opening and having an opposite terminal end extending from the body to be connected in the motor circuit, a second electrical conductor member is mounted on the body having one end disposed adjacent the recess side wall opening spaced from the first conductor member and having an opposite end connected to one end of the contact arm at said opposite side of the recess, and a third electrical conductor member is mounted on the body having one end connected to the first contact at said one side of the recess and having an opposite terminal end extending from the body to be connected in the motor circuit, the heater disposed in the recess having opposite ends thereof extending through said recess side wall opening and respectively connected to said one end of the first and second conductor members for electrically connecting the heater, the conductors, the movable contact arm, and the first contact in series relation with each other.

8. A motor protector according to claim 7 further characterized in that said one ends of the first and second electrical conductor members are electrically connected to respective opposite ends of the heater by laser welds.

9. A motor protector according to claim 7 further characterized in that the first and second electrical conductor members are mounted on the body with said one ends thereof extending over respective body openings to be accessible from both sides of the protector body, and said opposite heater ends are welded to said respective conductor members ends at the location of said openings.

10. A motor protector according to claim 9 further characterized in that resistance weld projections are provided on said one ends of the first and second electrical conductor members at the location of said body openings and the opposite ends of the heater are arranged to engage such weld projections over the body openings, said one conductor member ends being electrically connected to said respective heater ends by resistance welds at said body openings.

11. A motor protector according to claim 7 further characterized in that grooves are provided in said one body side for receiving and locating the respective electrical conductor members in predetermined location relative to the heater and to each other, each of the conductor members has a staking tab portion extending into a corresponding staking opening in the body and bent within the staking opening for securing the conductor members in said predetermined locations, the first contact means is mounted in predetermined location on said third contact member, and the contact arm has said one end thereof mounted in predetermined location on said second conductor member so the arm normally extends in predetermined location over the recess to engage the first contact, the body having an adjusting opening located beneath a portion of said second conductor member for permitting the second member to be bent for adjusting contact pressure between the contact arm and said first contact.

12. A motor protector according to claim 11 further characterized in that the contact arm has a protuberance formed therein intermediate its ends to be engaged by the thermostat metal disc for moving the arm to open circuit position when the disc moves to its inverted dished configuration in response to heating its actuating temperature, and the arm has a stiffening rib upstanding therefrom between the protuberance and the opposite arm end for a limiting flexing of the spring arm.

13. A motor protector according to claim 12 wherein the first and third conductor members are formed of cold rolled steel, one of said conductor members has a cross sectional size selected for providing selected thermal coupling of the thermostat metal member to the motor through said one conductor member, and the other of said members has a portion of selected, relatively smaller cross sectional size located in its respective groove intermediate member end for limiting heat transfer away from the thermostat metal member through said other conductor member.

14. A motor protector according to claim 5 further characterized in that a cover of thermally and electrically insulating material is secured to the body to extend over the body recess and said movable contact arm, the cover having a protuberance depending toward said opposite arm end to be in selected spaced relation to the opposite arm end when engaged with the first contact and to engage the opposite arm end for limiting arm movement when disengaged from the first contact, thereby to limit bouncing movement of the opposite arm end.

15. A motor protector comprising a molded, thermally and electrically insulating body having a recess open at one side of the body, the recess having a bottom an a side wall and having a shoulder in the side wall facing the open recess end, an electrical resistance heater arranged in the recess located against the recess bottom extending around the recess to be connected in a motor circuit to carry the motor current, a round, dished thermostat metal disc adapted to move from an original dished configuration to an inverted dished configuration a resilient movable electrically conductive spring contact arm electrically connected to the heater to be electrically connected in the motor circuit to be at the same polarity as the heater in that circuit, the arm having one end mounted on the body at an opposite side of the recess to extend across the open recess end to normally engage an opposite end of the arm with the first contact for energizing the motor during normal motor operation, to be moved to disengage the first contact and interrupt motor operation when the disc is heated to said actuating temperature by occurrence of either of short time trip and ultimate trip motor fault currents in the heater, and to reengage the first contact for reenergizing the motor when the disc cools to said reset temperature, characterized in that a cover of thermally and electrically insulating material is secured to the body to extend over said recess and over said movable contact arm, the cover having a pair of protuberances depending therefrom into the body recess on respective opposite sides of the contact arm to be disposed adjacent respective peripheral portions of the thermostat metal disc to securely retain the disc in said selected thermal coupling in the heater in the body recess.

* * * * *

UNITED STATES PATENT AND TRADEMARK OFFICE
CERTIFICATE OF CORRECTION

PATENT NO. : 4,713,717

DATED : December 15, 1987

INVENTOR(S) : Radi Pejouhy, Joseph G. Nield, Jr., John R. D'Entremont, Louis C. Beggs, Fabrizio Rotulo It is certified that error appears in the above—identified patent and that said Letters Patent is hereby corrected as shown below:

Title page, after "[22] Filed: Nov. 4, 1985", insert ---

"[30] Foreign Application Priority Data

Mar. 15, 1985 [IT] Italy ----- 47818 A/85"

Signed and Sealed this

Twenty-fourth Day of January, 1989

Attest:

DONALD J. QUIGG

*Attesting Officer* *Commissioner of Patents and Trademarks*